United States Patent

Udelle et al.

[11] Patent Number: 5,542,376
[45] Date of Patent: Aug. 6, 1996

[54] ANIMAL ENTERTAINMENT AND EXERCISE STIMULATOR

[76] Inventors: Steven D. Udelle; Laura L. Udelle, both of 26414 Barranquilla Ave., Punta Gorda, Fla. 33983

[21] Appl. No.: 376,770

[22] Filed: Jan. 23, 1995

[51] Int. Cl.⁶ .................................................. A01K 29/00
[52] U.S. Cl. ........................................... 119/707; 446/136
[58] Field of Search ............................... 119/707, 711; 446/136, 170

[56] References Cited

U.S. PATENT DOCUMENTS

| | | | |
|---|---|---|---|
| 2,918,284 | 12/1959 | Baca | 446/136 X |
| 3,326,555 | 6/1967 | Warren | 446/136 X |
| 3,387,393 | 6/1968 | Musser | 446/136 X |
| 4,304,060 | 12/1981 | Tanguay | 446/136 X |
| 4,722,299 | 2/1988 | Mohr | |
| 4,871,340 | 10/1989 | Ross | 446/132 |
| 5,269,261 | 12/1993 | McCance | 119/706 |

Primary Examiner—Robert P. Swiatek
Assistant Examiner—Elizabeth Shaw

[57] ABSTRACT

An animal entertainment and exercise device comprising a device housing 14, a top transparent cover 10, an opaque arena lure floor 30, a ball shaped lure 16 containing a magnet 16a, confined between the top transparent cover 10 and the opaque arena lure floor surface 30. A motor mechanism is concealed below the lure floor surface 30, and is comprised of a motor 18, motor output shaft 20, and a sweep arm 22. A plurality of permanent magnets 26 and 24 are affixed to sweep arm 22 of the mechanism. Motor 18 is energized from voltage source 42, via transformer/plug 40 through connecting wires 38, and then to motor 18. The motor 18 operates at a predetermined RPM, thereby orbiting the ball shaped lure 16 around the opaque lure floor surface 30.

21 Claims, 3 Drawing Sheets

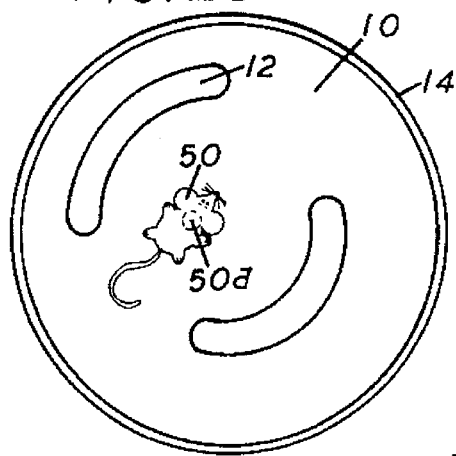
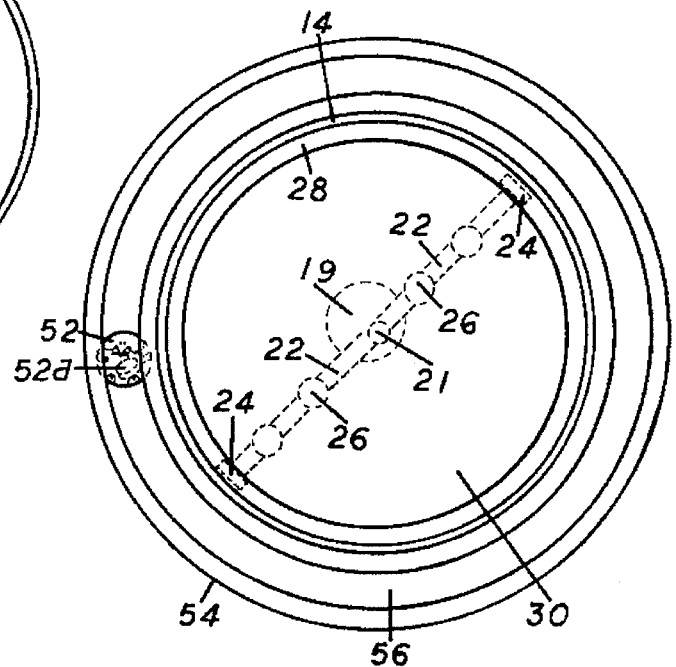
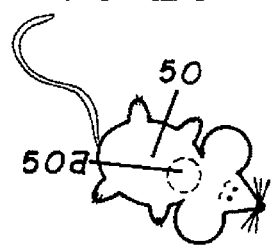
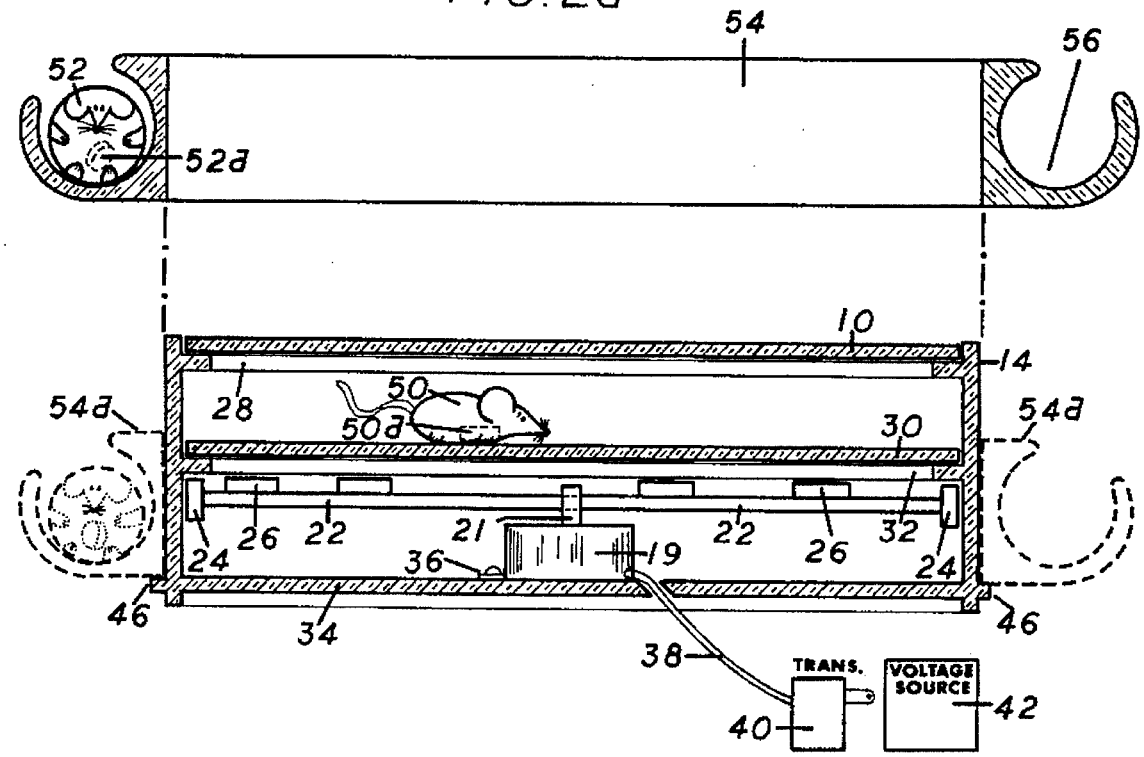

5,542,376

ANIMAL ENTERTAINMENT AND EXERCISE STIMULATOR

FIELD OF THE INVENTION

The present invention deals with animal amusement and toy devices, but more particularly to a combination animal entertainment and exercise stimulator that provides motion as a compelling attraction to an animal, whereby an animal will frequent the device on its own initiative more often, thereby improving its physical condition, health, and mental alertness through its own efforts.

BACKGROUND-DISCUSSION OF THE PRIOR ART

Animal toys and amusement devices have a movable object on, around, or within these devices. An animal is usually shown by demonstration the movable or rolling object in the device, whereby the animal's inherent instinct to attack, or play with a moving object is imminent. However, these objects have to be initially moved by an animal or a human to begin with, and unfortunately a good device becomes unused for long periods of time and just occupies space. Cats can easily become obese, bored, and listless from lack of frequent entertainment and exercise over a period of time. The prior art more closely associated to the present invention are U.S. Pat. No. 4,722,299, by Mohr, Feb.2, 1988, which shows a toy with a closed loop or track, containing a loose ball inside the track housing. The ball is captive within the housing and is exposed to the continuous opening of the inside edge of the loop. A cat can swat the ball around the track by putting its paw through a continuous opening inside the loop's vertical side. U.S. Pat. No. 5,269,261, by McCance, Dec. 14, 1993, shows a similar device to Mohr, wherein the ball is visible at the top of the track, and the center portion of the loop contains a replaceable corrugated cardboard scratching pad. U.S. Pat. No. 4,871,340, by Ross, Oct. 3, 1989, shows a hand held, magnetic toy track having a rolling, permanent magnet. By becoming adept at moving the device by hand, a magnet is caused to roll around the saucer shaped track. The above prior art devices are dormant when not in use. The prior art does not teach on the use of a motivational means that would exhibit an irresistable incentive or attraction to an animal, whereby the animal would benefit from increased use of the device more often. The present invention takes advantage of the inherent instincts of an animal's response to a moving object, when the original movement of the object is not physically initiated by the animal or human hand, but by the device.

SUMMARY OF THE INVENTION

The present invention utilizes the phenomena of invisible or unseen forces of magnetic fields. In the space around every permanent or electromagnet, there exists a magnetic field. A magnetic field is an example of the physical phenomenon known as a force field, inherent in every electric charge and in the gravitational field around every mass, electromagnet, and permanent magnet. When placing several force fields in close proximity to each other, the unlike force fields will attract and the like force fields will repel. The present invention deals with invisible or unseen force fields and their action and reaction when employing several objects with force fields in close proximity to each other for producing a device that would be useful to an animal. Generally, the preferred embodiment of the present invention comprises an enclosed, bordered surface area resembling a circular arena. An electric motor drives a sweep arm at a predetermined rotative speed that is concealed within the housing below the arena floor surface. The sweep arm has a plurality of primary permanent magnets affixed to it at predetermined positions for maximum utilization of their respective inherent emanating unseen force fields. An unremovable ball shaped lure is confined within the arena enclosure. The ball shaped lure contains a loose, free moving, secondary permanent magnet within its shell having a sufficiently strong inherent force field. The interior of the ball has a plurality of nubs or mammaries projecting slightly from within the ball's interior surface. These nubs serve to intermittently trip, tilt, or hold the loose, secondary permanent magnet within the ball to various angles of force field positions, in respect to the predictable force field influence projected by the sweep arm primary magnets, thereby causing the ball to roll erratically, and then spin in an eccentric sideways fashion as it rotates or orbits around the arena floor surface between 10 to 30 RPM. The device can be operated from a level position, a vertical position, and even upside down for other uses, and the lure ball will continue its erratic orbits around the arena floor surface. The gyrating lure, when in reach of the elongated paw openings of the transparent arena top surface enclosure, quickly prompts a cat into action trying to capture the lure ball. The cat's attempt to capture the erratic ball can last for extended periods of time.

It is therefore an object of the present invention to provide an animal entertainment and exercise stimulating device that does not require an animal or a human hand to initiate the movement of the lure.

It is another object of the invention to activate the device when the animal is in its most active period two to three times a day for a duration of thirty minutes each.

It is an object of the invention to have an animal expend its surplus energy at scheduled intervals, thereby developing improved muscle tone, alertness, coordination, and better sleeping habits.

It is an object of the invention that upon activation of the device, a cat will always respond to the moving lure.

It is another object of the invention that the animal entertainment and exercise stimulator would relieve the animal from boredom by providing amusement, thereby saving areas of household furniture from damage.

Another object of the invention is that an enticement such as catnip, would no longer be required.

Other objects and advantages may be readily determined by the following descriptions.

BRIEF DESCRIPTION OF THE DRAWINGS

FIG. 2a is a plan top view of an alternate embodiment showing a transparent cover, a mouse shaped lure, and access openings.

FIG. 2b is a plan top view showing a motorized mechanism in hidden lines, and a circular ring containing a ball shaped lure.

FIG. 2c is a plan top view of a permanent magnet in hidden lines, affixed below a mouse shaped lure.

FIG. 2d is an exploded side plan view of the add-on ring and device housing in cross section showing component position in detail, including the final position of the add-on ring in hidden lines for additional illustration.

COMPLETE DESCRIPTION OF THE INVENTION

Figure 1A:
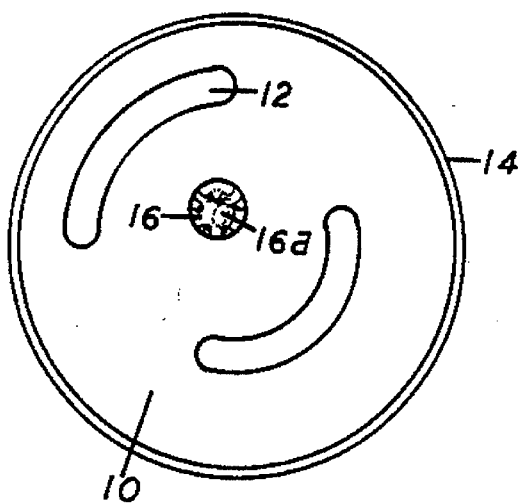
FIG. 1a is a plan top view of the preferred embodiment showing a transparent cover, lure ball, and access openings.

FIG. 1a is a top plan view of a preferred embodiment of the present invention, showing the perimeter edge of the device housing 14. Affixed within the topmost portion of the perimeter edge of housing 14 is a transparent plastic arena cover 10, with a plurality of elongated slotted openings 12 of sufficient size to accommodate a cat's paw therethrough. A movable object or ball shaped lure 16 containing a loose magnet 16a is always visible below the transparent plastic surface of the arena cover 10.

Figure 1C:
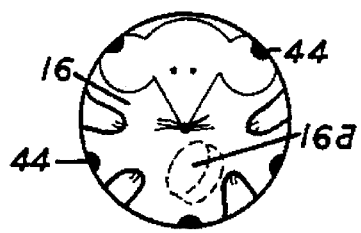
FIG. 1c is a perspective view of a permanent magnet within a ball shaped lure.
Figure 1B:
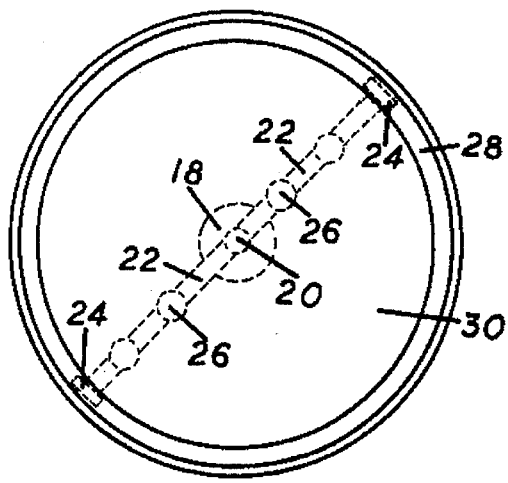
FIG. 1b is a plan top view showing a motorized mechanism in hidden lines.

FIG. 1b is a top plan view of the device with the top transparent arena cover 10 of FIG. 1a removed exposing mounting ledge 28. The arena lure floor surface 30 is made of an opaque plastic material concealing below, a motor 18, motor output shaft 20, sweep arm 22, and primary magnets 26 and 28 shown in hidden lines.

FIG. 1c is a perspective view of a ball shaped lure 16 containing a loose permanent secondary magnet 16a including a plurality of projecting nubs 44 within its shell.

Figure 1D:
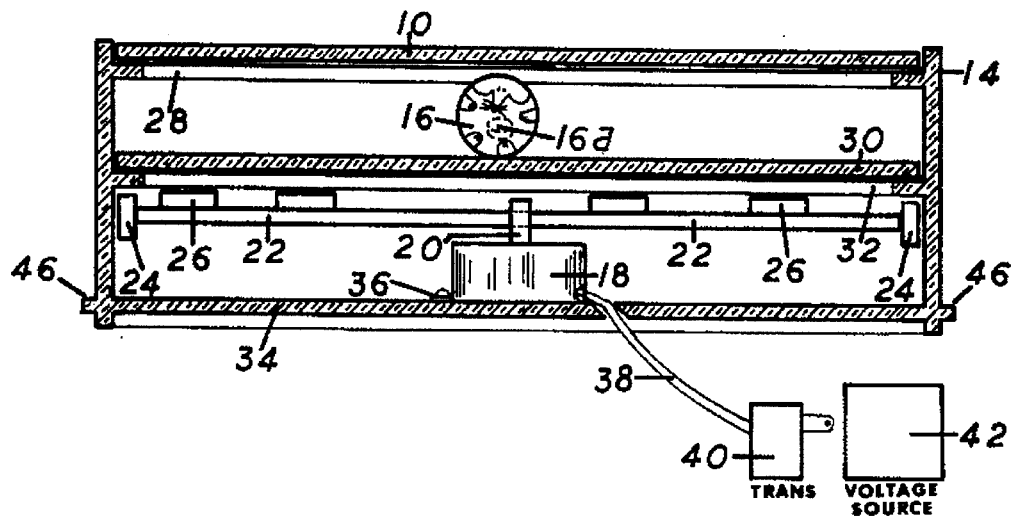
FIG. 1d is a plan side view of the device housing, in cross section, showing the component positions in detail.

FIG. 1d shows a plan view in cross section of the device housing 14 comprised of a top transparent arena cover 10 affixed to a mounting ledge 28, an opaque arena lure floor 30 affixed to a mounting ledge 32, a ball shaped lure 16 containing a loose permanent magnet 16a within its shell, confined between the top transparent arena cover 10, and the opaque arena lure floor surface 30. Below the arena lure floor surface 30 is a concealed mechanism consisting of a motor 18, mounted by fasteners 36 to base floor 34. The direct motor shaft output 20 is connected to an elongated sweep arm 22 mounted at a right angle to the motor output shaft 20. A plurality of primary magnets 26 and 24 are affixed to the sweep arm 22 of the mechanism. The motor 18 is energized from the voltage source 42, via transformer/plug 40 to wires 38 connected to motor 18. The wires 38 are of sufficient low voltage and harmless to an animal if chewed. The interior of the lure ball 16 has a plurality of nubs or mammaries 44 of fig. 1c projecting slightly from within the ball's interior surface. These nubs serve to intermittently trip, tilt, or hold the loose secondary permanent magnet 16a within the ball 16 to various angles of force field positions, in respect to the predictable force field influence projected by the sweep arm primary permanent magnets 26. These various angles of force field positions in the secondary magnet 16a causes the ball to roll erratically, and then spin in an eccentric sideways fashion as it rotates around the opaque arena floor surface 30. When the ball shaped lure 16 is displaced from its orbital path by a cat's paw, a new orbital path is immediately acquired, wherein the lure ball will perform differently. The erratic movement of the lure 16 is an irresistable challenge to a cat's inherent instincts to stalk, attack, catch, or play with a moving prey. The arena floor surface can accommodate six or more ball shaped lures simultaneously and they will react differently from each other when orbiting the arena floor. At one to fifty RPM, the sweep arm magnets influence a lure to orbit at the same RPM producing unusual gyrations. Sweep arm speeds of sixty RPM and above produce wilder gyrations from the lure. The lure no longer orbits at the same RPM as the sweep arm, but is coaxed to move very erratically by the influencing primary force field emanating from the sweep arm. The lure changes orbital paths as well as producing wider, eccentric spinning movements and orbits about fifteen to twenty RPM. A circular ledge 46 and primary permanent magnets 24 mounted at the extreme ends of the sweep arm 22 are for an optional accessory device.

FIGS. 2a, 2b, 2c, and 2d are alternate embodiments of FIGS. 1a, 1b, 1c, and 1d.

FIG. 2a is a plan top view, identical to FIG. 1a, except for an unrollable mouse shaped lure 50 containing a secondary permanent magnet in hidden lines.

FIG. 2b is a top plan view identical to FIG. 1b, except for a motor 19 with a geared output shaft 21 shown in hidden lines. An optional add-on accessory or permanently affixed lure ring 54 surrounds the housing perimeter 14 and confines a rollable ball shaped lure 52 containing a secondary permanent magnet 52a, within the partially open lure ring recess 56.

FIG. 2c shows a plan top view of an alternate, unrollable mouse shaped lure 50 with a secondary permanent magnet 50a shown in hidden lines affixed to its underside.

FIG. 2d is a plan side view of the lure ring 54 and device housing 14 in an exploded cross section display. This alternate embodiment is identical to FIG. 1d, except for a motor 19 internally geared to an output shaft 21. The lure ring 54 rests or is permanently affixed to circular mounting ledge 46 and confines a rollable lure containing a secondary permanent magnet 52a within the partially exposed ring recess 56. A primary permanent magnet 24 is affixed at opposite ends of sweep arm 22, and through action and reaction between the primary and secondary force fields, the movable object or ball shaped lure 52,containing a secondary permanent magnet 52a, rolls and spins as it orbits around the lure ring interior 56, in unison with the unrollable mouse shaped lure 50 on the opaque arena floor surface 30. At output shaft speeds of ten to thirty RPM, the mouse shaped lure intermittently slides and then spins, chasing its tail, while the ball shaped lure 52 does a repetitious hop, spin, and roll combination. These combined erratic movements are irresistable to a cat.

Figure 3:
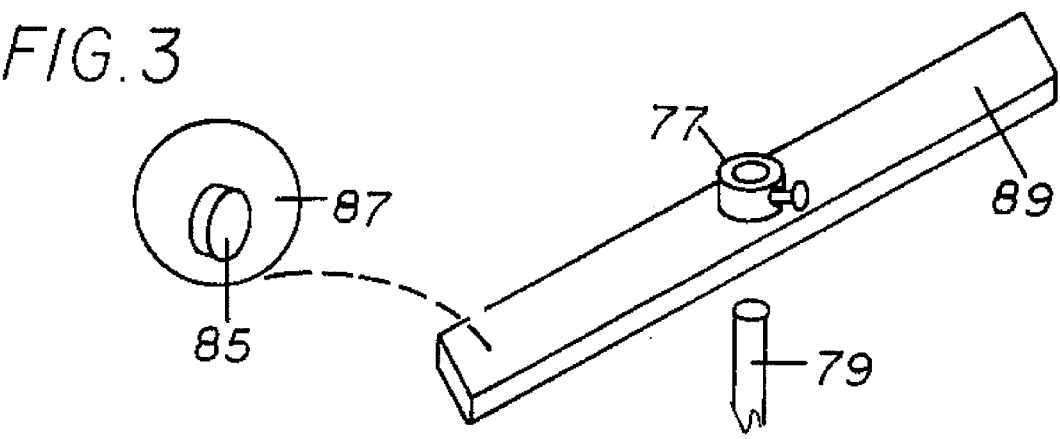
FIG. 3 is a perspective view of an alternate sweep arm, showing a metallic sweep arm with a ball shaped lure containing a loose permanent magnet.

FIG. 3 is a perspective view of an alternate sweep arm showing a metallic sweep arm 89 void of primary permanent magnets with a cutaway view of motor shaft 79 and a shaft hub with a set screw 77. The loose permanent magnet 85 within the shell of the lure ball 87 is strongly attracted to the metallic sweep arm 89.

Figure 4:
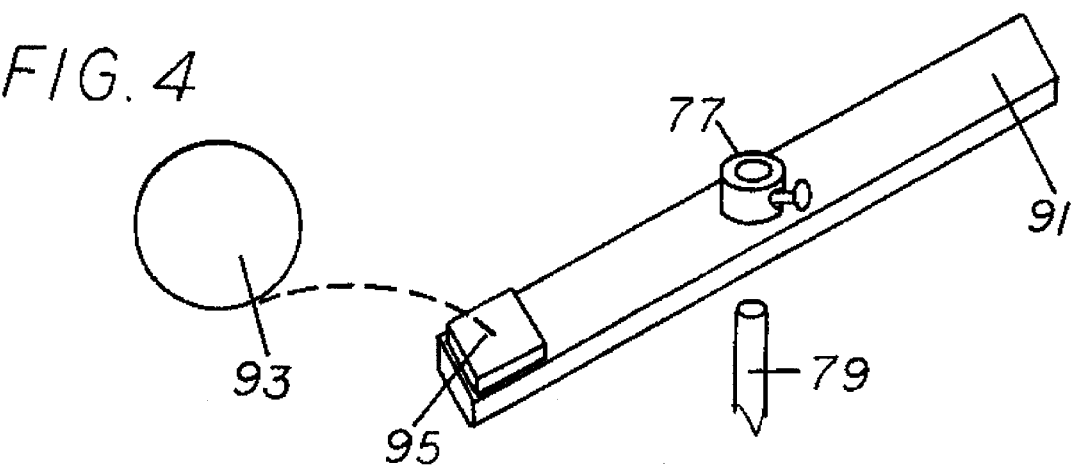
FIG. 4 is a perspective view of an alternate sweep arm showing a sweep arm with at least one magnet, with a metallic ball shaped lure.

FIG. 4 is a perspective view of an alternate sweep arm showing a sweep arm 91 made of a pre-selected material with a permanent magnet 95 affixed to the surface of one end of the sweep arm 91, a cutaway view of motor shaft 79, and a shaft hub with a set screw 77. The permanent magnet 95 is strongly attracted to a thin metallic lure ball 93.

Figure 5:
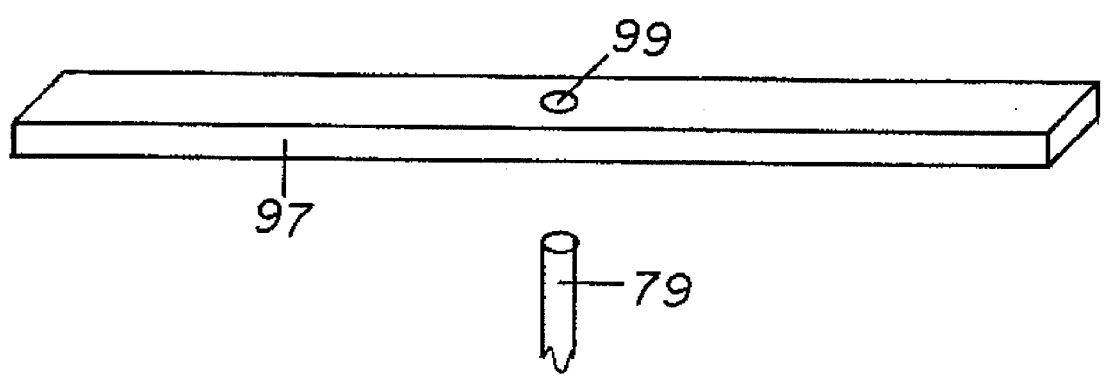
FIG. 5 is a perspective view of an alternate shaft mounted sweep arm showing an elongated permanent bar magnet.

FIG. 5 is a perspective view of an alternate sweep arm showing a typical mounting method, whereby an elongated permanent bar magnet 97 has a circular opening 99 for insertion on motor shaft 79 affixed by press fit or epoxy cementing.

Applicants employed a potentiometer, or rheostat in series to the power wiring of the invention prototypes, to study the behavior of the movable object at output shaft speeds of 1 to 300 RPM, to determine the best RPM ranges for the most favorable movable object behavior. The output shaft RPM is not limited to a specific RPM envelope, as the movable object orbits and performs differently at various RPM ranges, and therefore can be custom selected with predetermined revolution per minute design. Grade 5 ceramic disk permanent magnets were used in the prototypes. Additional features can be employed to the aforementioned device, such as illuminating the interior of the colored plastic housing, which would produce an interesting glow on the exterior plastic surfaces, or using a ball shaped lure with glow in the dark properties.

CONCLUSION

Thus it has been shown that the animal entertainment and exercise stimulator can perform all of the objectives as outlined above. Many other variations are possible. For example, it would be obvious to those already skilled in the art that may consider electromagnetic force fields in lieu of permanent magnets, or a combination thereof, or intermittently powered motors to create a stop and go lure movement, or lures in other shapes mounted differently. It would be obvious to provide adjustable permanent magnets for various positioning, to vary the lure's orbiting performance, or using sensors such as heat or motion to activate the device automatically, or electronic sound synthesizers, and further including mounting the device vertically for other purposes. While the above descriptions may contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:

1. An animal entertainment arena device comprising:
   a) a circular housing forming a vertical sidewall having a lower edge and an upper edge;
   b) said lower edge comprising a base and having a lower horizontal surface supported by said vertical sidewall;
   c) said upper edge of said vertical sidewall having a horizontal ledge orthogonal to said upper edge, said ledge supporting an upper horizontal surface employing at least one elongated access opening, whereby an animal may place its paw and foreleg therethrough; and
   d) said vertical sidewall further supporting a center horizontal surface midway between said lower horizontal surface and said upper horizontal surface; and
   e) said center horizontal surface employing a freely movable object thereon comprising a hollow ball containing a loose permanent magnet confined therein; and
   f) a shaft disposed below said center horizontal surface; and
   g) means for rotating said shaft disposed below said center horizontal surface of said housing; and
   h) means for producing a magnetic field coupled to said shaft and disposed below said center horizontal surface, wherein rotation of said shaft causes said means for producing a magnetic field to rotate within said housing, the magnetic field produced thereby influencing said freely movable object to continuously move about upon said center horizontal surface.

2. The device of claim 1 wherein said means for rotating said shaft comprises an electric motor assembly.

3. The device of claim 1 wherein said means for producing a magnetic field comprises an elongated arm mounted to said shaft at a right angle therewith and at least one permanent magnet affixed thereon said arm remote from said shaft.

4. The device of claim 1 wherein said means for producing a magnetic field comprises a permanent magnet in the form of an elongated arm mounted to said shaft at a right angle therewith.

5. The device of claim 1 wherein said freely movable object thereon is of a slideable mouse configuration having a permanent magnet affixed thereto.

6. The device of claim 1 further comprising an annular continuous track ring encircling said vertical sidewall of said housing, said continuous track having an open top to provide access to the interior thereof.

7. The device of claim 6 wherein said continuous track is removably attached to said housing.

8. The device of claim 6 wherein said continuous track having an open top employs an object within said interior and freely movable therein.

9. The device of claim 8 wherein said object said freely movable therein is a ball.

10. The device of claim 9, wherein said object said freely movable therein is a hollow ball containing a loose permanent magnet confined therein.

11. An animal entertainment arena device comprising:
   a) a circular housing forming a vertical sidewall having a lower edge and an upper edge;
   b) said lower edge comprising a base and having a lower horizontal surface supported by said vertical sidewall near said lower edge;
   c) said upper edge of said vertical sidewall having a ledge orthogonal near said upper edge, said ledge supporting a transparent upper horizontal surface employing a plurality of arcuate elongated access openings, whereby an animal may place its paw and foreleg therethrough; and
   d) said vertical sidewall further supporting an opaque center horizontal surface disposed midway between said lower horizontal surface and said upper horizontal surface;
   e) said opaque center horizontal surface employing a freely movable object thereon comprising a hollow ball containing a loose permanent magnet confined therein; and
   f) a shaft disposed below said opaque center horizontal surface; and
   g) means for rotating said shaft disposed below said opaque center horizontal surface of said housing; and
   h) means for producing a magnetic field coupled to said shaft and disposed below said opaque horizontal center surface, wherein rotation of said shaft causes said means for producing a magnetic field to rotate within said housing, the magnetic field produced thereby influencing said freely movable object to continuously move about upon said opaque center horizontal surface.

12. The device of claim 11, wherein said means for rotating said shaft comprises an electric motor assembly.

13. The device of claim 11 wherein said means for producing a magnetic field comprises an elongated arm mounted to said shaft at a right angle therewith and at least one permanent magnet affixed thereon said arm remote from said shaft.

14. The device of claim 11 wherein said means for producing a magnetic field comprises a permanent magnet in the form of an elongated arm mounted to said shaft at a right angle therewith.

15. The device of claim 11 wherein said housing is circular in cross-section.

16. The device of claim 11 wherein said freely movable object thereon comprises a slideable mouse configuration having a permanent magnet affixed thereto.

17. The device of claim 11 further comprising an annular continuous track ring encircling said vertical sidewall of said housing, said continuous track having an open top to provide access to the interior thereof.

18. The device of claim 17, wherein said continuous track is removably attached to said housing.

19. The device of claim 17, wherein said continuous track having an open top employs an object within said interior and freely movable therein.

20. The device of claim 19, wherein said object said freely movable therein is a ball.

21. The device of claim 20, wherein said ball is hollow and contains a loose permanent magnet confined therein.

* * * * *